United States Patent
Gundavelli et al.

(10) Patent No.: US 10,992,712 B2
(45) Date of Patent: Apr. 27, 2021

(54) MULTIPATH SUBFLOW ANCHORING FOR SECURITY POLICY ENFORCEMENT

(71) Applicant: Cisco Technology, Inc., San Jose, CA (US)

(72) Inventors: Srinath Gundavelli, San Jose, CA (US); Nandini Ganesh, Fremont, CA (US); Pradeep Kathail, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 450 days.

(21) Appl. No.: 15/906,288

(22) Filed: Feb. 27, 2018

(65) Prior Publication Data
US 2019/0268375 A1    Aug. 29, 2019

(51) Int. Cl.
*H04L 29/06* (2006.01)
*H04W 12/06* (2021.01)
*H04W 12/08* (2021.01)

(52) U.S. Cl.
CPC .......... *H04L 63/20* (2013.01); *H04L 63/0884* (2013.01); *H04W 12/06* (2013.01); *H04W 12/08* (2013.01)

(58) Field of Classification Search
CPC .... H04L 63/20; H04L 63/0884; H04W 12/06; H04W 12/08
See application file for complete search history.

(56) References Cited

U.S. PATENT DOCUMENTS

| 9,185,562 | B2 | 11/2015 | Reddy et al. | |
| 2013/0111038 | A1* | 5/2013 | Girard | H04L 47/803 709/226 |
| 2015/0124622 | A1 | 5/2015 | Kovvali et al. | |
| 2016/0142373 | A1 | 5/2016 | Ossipov | |
| 2017/0163774 | A1 | 6/2017 | Boucadair et al. | |
| 2019/0363974 | A1* | 11/2019 | Wang | H04L 12/66 |

OTHER PUBLICATIONS

Catherine Pearce, "Multipath TCP, PWNING Today'S Networks With Tomorrow's Protocols", NEOHAPSIS, www.neohapsis.com, Blackhat USA 2014, 2016, 15 pages.

Q. De Coninck et al., "Multipath Extension for QUIC", draft-deconinck-multipath-quic-00, QUIC Working Group, Internet-Draft, Intended status: Standards Track, Oct. 30, 2017, https://tools.ietf.org/html/draft-deconinck-multipath-quic-00, 20 pages.

* cited by examiner

*Primary Examiner* — Shin-Hon (Eric) Chen
*Assistant Examiner* — Jesssica J South
(74) *Attorney, Agent, or Firm* — Edell, Shapiro & Finann, LLC (57) ABSTRACT

A policy server determines and explicitly provides a source host with a multipath access policy. The policy server obtains a notification that the source host is connected to an access network. The notification includes authentication credentials of a user of the source computing device. The policy server determines a multipath policy based on the authentication credentials. The multipath policy determines whether data flows from the source host are transmitted over multiple network connections. The policy server determines a set of one or more multipath proxy devices based on the authentication credentials, and provides an access policy to the source host. The access policy includes the multipath policy and network addresses associated with the multipath proxy devices.

23 Claims, 9 Drawing Sheets

MULTIPATH SUBFLOW ANCHORING FOR SECURITY POLICY ENFORCEMENT

TECHNICAL FIELD

The present disclosure relates to multipath data transmission over computer networks.

BACKGROUND

Enterprises now have the option to expand and increase coverage density of wireless networks by integrating various radio technologies, such as IEEE 802.11, Long Term Evolution-Unlicensed (LTE-U), and small cell, into wireless connectivity services provided by the enterprises. With the creation of Citizen's Broadband Radio Service (CBRS) by the Federal Communication Commission (FCC), approximately 150 MHz of allocated spectrum in the 3.5 GHz band can be used by the enterprises for wireless access under certain sharing regulations. With the availability of multiple radio technologies, enterprises can provide multi-access support for mobile devices.

Multipath network connections open up issues with network services provided in the network, such as firewalls or deep packet inspection functions, which may not be able to perform distributed correlation of flows being routed through different access paths. As a result of inadequate visibility and control into the subflows of a multipath data flow, enterprise firewalls are often configured to drop all multipath subflows as a default policy.

DESCRIPTION OF EXAMPLE EMBODIMENTS

Overview

In one embodiment, a computer-implemented method is provided for a policy server to determine and explicitly provide a source computing device with a multipath access policy. The method includes receiving a notification that a source computing device is connected to an access network. The notification includes authentication credentials associated with a user of the source computing device. The method also includes determining a multipath policy based on the authentication credentials. The multipath policy determines whether data flows from the source computing device are transmitted over multiple network connections. The method further includes determining a set of one or more multipath proxy devices based on the authentication credentials. The method includes sending an access policy to the source computing device. The access policy comprises the multipath policy and one or more network addresses associated with the set of one or more multipath proxy devices.

DETAILED DESCRIPTION

To meet the growing need for bandwidth and for improving connectivity, mobile devices may be equipped with multiple radio interfaces (e.g., user equipment with integrated CBRS, IEEE 802.11, and LTE radios). Furthermore, mobile operating system stacks may include multipath (MP) support, such as MP Transport Control Protocol (MPTCP) or MP Quick User Datagram Protocol Internet Connection (MP-QUIC). In some examples, MP-proxies enable an application that is not natively multipath capable to handle multipath communications. With the evolution towards multiple radio technologies on both the network and the devices, an application may establish multipath connectivity by registering multiple Internet Protocol (IP) transport endpoints with an application peer (or through a proxy), resulting in increased bandwidth by virtue of link aggregation.

The techniques presented herein address issues of how an enterprise network ensures that all of the subflows of a specific flow/user are directed through a selected multipath proxy node where the enterprise will have finer control on the flow inspection and deep packet inspection. Additionally, the network provides multipath proxy information and a multipath policy to mobile devices in a dynamic fashion, which may be tied to the enterprise software defined network architecture. Mechanisms allow for allocating a multipath proxy node based on the subscriber identity, location, and/or application. For instance, the system may selective enable/disable multipath usage for specific applications, specific users, specific access networks, and/or specific locations. The techniques described herein also allow for approaches to massively scale multipath sessions by selecting multipath proxy devices on a subscriber basis, e.g., all subscribers at a specific location will be assigned a corresponding multipath proxy device. Further, subflows may be tagged with correlators for distributed correlation, as an alternative approach when a multipath proxy is not used.

Many multipath protocols (e.g. MPTCP, MP-QUIC) are end-to-end protocols, requiring both the source and the destination to support multipath interfaces. As not every application on every device currently supports multipath protocols, the use of multipath proxy devices enables a transition period in which application that only support single path streams may be supported by a multipath capable proxy until the application/device is updated. In this way, network operators may offer higher throughput network access for a better customer experience and to meet the growing demand for bandwidth from subscribers.

Figure 1:
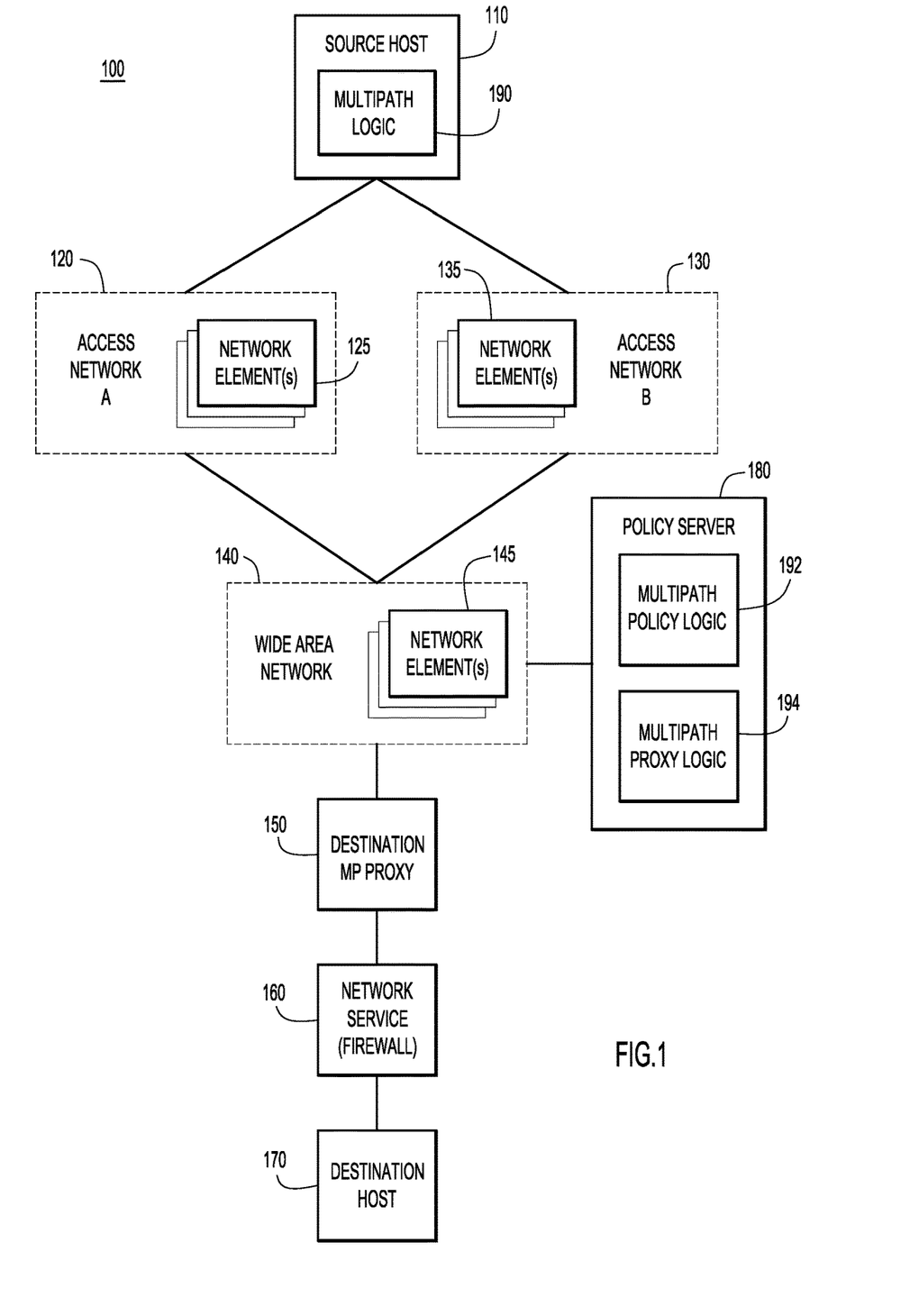
FIG. 1 is a simplified block diagram of a system for providing a multipath proxy anchor for a source host device, according to an example embodiment.

Referring now to FIG. 1, a multipath system 100 is shown that is configured to dynamically provide multipath access and enterprise control of network services. The system includes a source host 110 that is configured to connect to access network 120 via one or more network elements 125. The source host 110 also connects to access network 130 via one or more network elements 135. Both the access network 120 and the access network 130 are further connected to a wide area network 140, e.g., an IP network such as the Internet, via one or more network elements 145. A multipath proxy 150 is connected to the network 140 and serves as an anchor node for multipath data flows. The multipath proxy 150 binds all of the subflows of a multipath data flow into a single stream. A network service 160 operates on the single stream from the multipath proxy 150 before the data flow reaches the destination host 170. A policy server 180 is connected to the network 140, and provides authentication and/or authorization support for the system 100.

The source host 110 includes multipath logic 190, which is configured to direct the source host 110 in handling multipath data flows according to an access policy provided by the policy server 180. Multipath policy logic 192 and multipath proxy logic 194 in the policy server 180 are configured to determine an appropriate multipath access policy for the source host 110 based on various factors, such as the identity of the source host 110, the load on the networks 120, 130, and 140, and/or the load on the multipath proxy 150.

In one example, the source host 110 may be a physical or virtual computing device that is configured to communicate over a plurality of different wired or wireless technologies. Alternatively, the source host 110 may include a separate multipath proxy to provide the multipath capability to a source device that does not include the different network interfaces required for multipath data transmission.

In another example, the access networks 120 and 130 may be wired or wireless networks that enable the source host 110 to access additional computer networks, such as the network 140. The network elements 125, 135, and 145 may include switches, routers, gateways, controllers, and/or access points in one or more network topologies (e.g., star, full or partial mesh, spine/leaf, etc.).

In a further example, more than one multipath proxy device 150 may be available to serve as an anchor node for multipath data flows from the source host 110. Similarly, more than one network service 160 may be provided to operate on the data flows from the source host 110 to the destination host 170. In some instances, the network service 160 may include a firewall service, an intrusion detection/prevention service, a deep packet inspection service, or another network service that may use information across multiple packets in a data flow.

In still another example, the policy server 180 may be an Authentication, Authorization, and Accounting (AAA) server that is configured by an enterprise to provide security policies to various endpoint hosts that connect to the enterprise network. The policy server 180 may provide additional AAA policies in addition to the multipath policy described herein. Alternatively, separate servers may be provided for multipath policies and for other AAA policies.

Figure 2A:
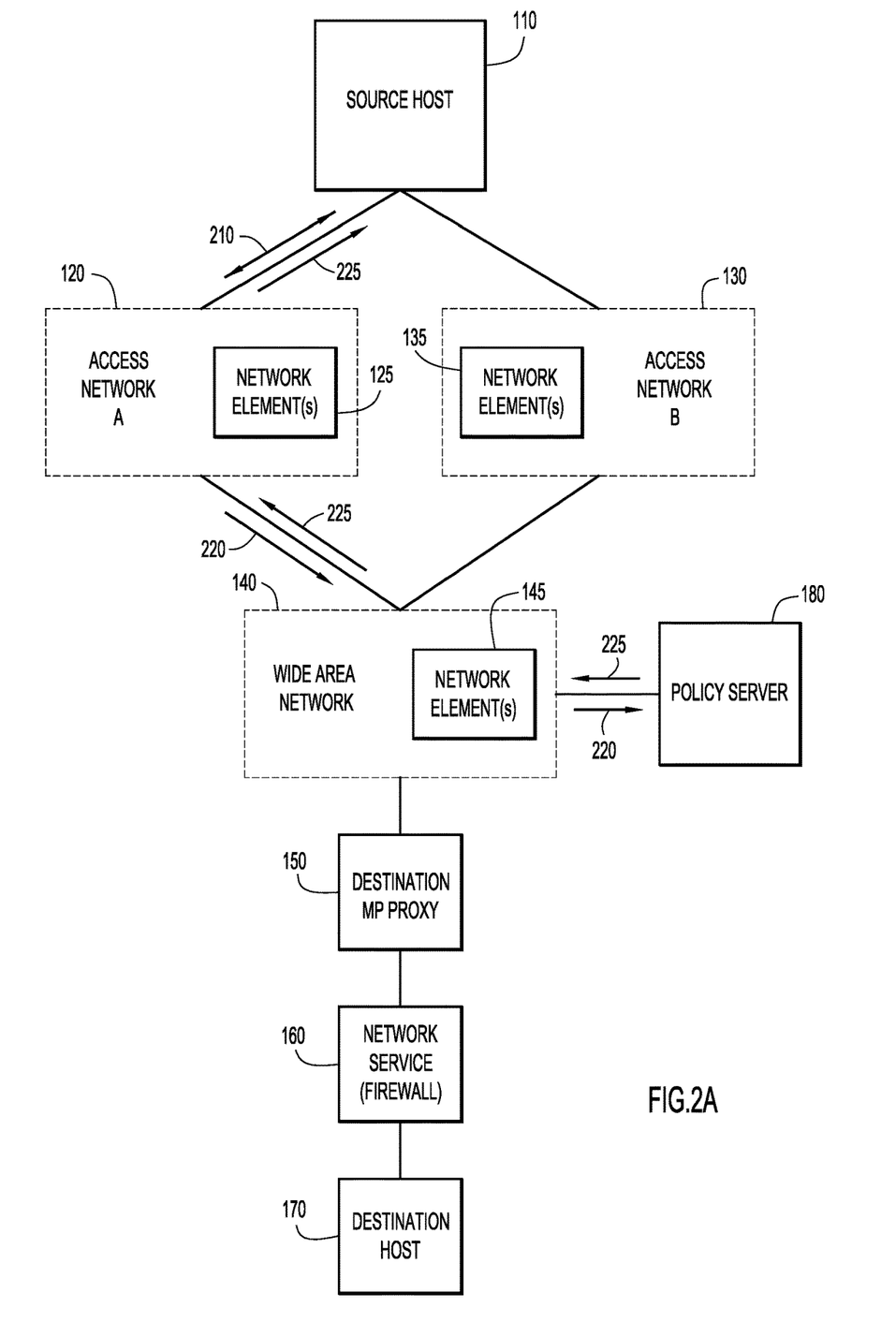
FIG. 2A is a simplified block diagram illustrating a policy server providing a multipath access policy to a source host, according to an example embodiment.

Referring now to FIG. 2A, a simplified block diagram illustrates a source host 110 connecting to an access network and receiving a multipath access policy specific determined by the policy server 180. Initially, the source host 110 negotiates a connection 210 with the access network 120. In one example, the access network 120 may be a wireless network (e.g., IEEE 802.11, LTE, CBRS, etc.), and the source host 110 maintains the connection 210 through a wireless access point (e.g., one of the network elements 125). The source host 110 may provide authentication credentials (e.g., user name/password, token, etc.) to establish the connection 210 or once the connection 210 has been established.

When the source host 110 is connected to the access network 120, the controller of the access network 120 sends a notification 220 to the policy server 180 (e.g., via the network 140). The notification 220 indicates that the source host 110 is connected to the access network 120, and may request a policy for a multipath data flow. The notification 220 may include the authentication credentials provided by the source host 110, as well as information about the access network 120.

The policy server 180 determines an appropriate multipath access policy 225 and sends the policy to the source host 110 via the access network 120. In one example, the multipath access policy 225 may include a multipath policy, such as a policy on which applications on the source host 110 that are specifically permitted to (or specifically prohibited from) sending data in a multipath flow. The multipath access policy may also include one or more network addresses corresponding to one or more multipath proxy devices 150 that the source host 110 is permitted to use for any multipath data flows.

In one example, the multipath access policy may include network addresses for a plurality of multipath proxy devices, with each multipath proxy device associated with a different type of data flow. For instance, web traffic may be directed to a different multipath proxy device than video or Voice over IP traffic. Further, different multipath proxy devices may be associated with specific applications. In this way, the access policy directs video traffic for a first application to a first multipath proxy device and directs video traffic for a second application to a second multipath proxy device.

Figure 2B:
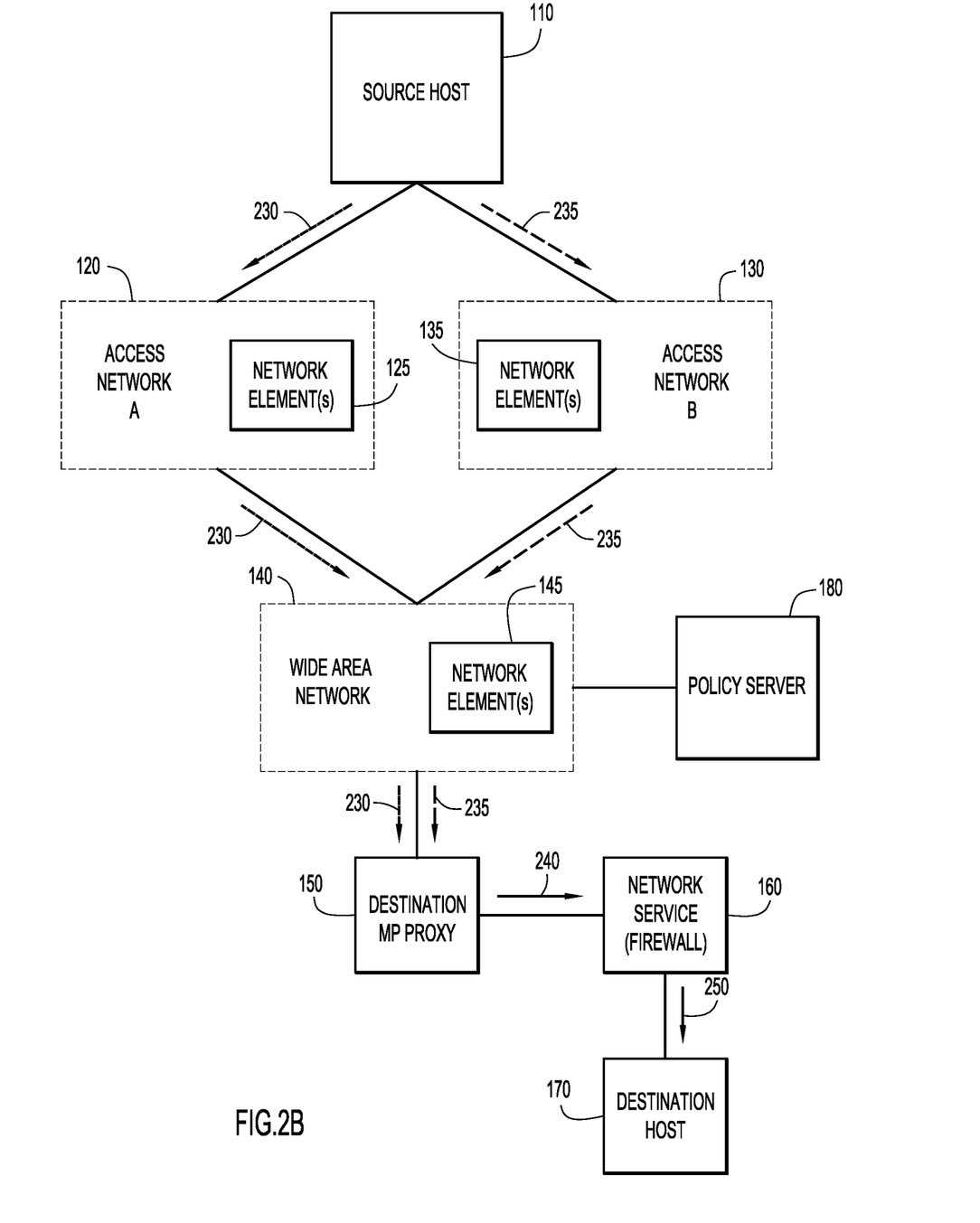
FIG. 2B is a simplified block diagram illustrating a source host sending a multipath data flow to a destination host via a multipath proxy device and a network service, according to an example embodiment.

Referring now to FIG. 2B, a simplified block diagram illustrates a source host 110 sending a multipath data flow to a destination host 170 according to a multipath access policy received from a policy server 180. After the source host 110 receives the multipath access policy from the policy server 180, as described with respect to FIG. 2A, the source host 110 directs one subflow 230 of the multipath data flow to one of the multipath proxy devices (e.g., multipath proxy 150) specified in the multipath access policy. In one example, the selected multipath proxy device 150 will act as the destination endpoint for the multipath data flow. The source host 110 sends another subflow 235 as part of the same multipath data flow via the access network 130 to the same multipath proxy device 150 as the subflow 230. The multipath proxy device 150 combines the subflows 230 and 235 into a single flow 240 and directs the flow 240 to the network service 160. Once the network service 160 operates on the flow 240, the flow 250 may be forwarded to the destination host 170. In one example, the multipath proxy device 150 terminates the multipath data flow from the source host 110 and creates a new, single path, data flow directed toward the destination host 170.

In another example, the subflows 230 and 235 may be MPTCP or MP-QUIC subflows that are combined to create a single TCP or QUIC flow 240. The packets in the subflows 230 and 235 may include headers that encapsulate payloads directed to the destination host 170. For instance, during the initiation of the first subflow 230, the source host 110 may specify (e.g., as part of a TCP Fast Open (TFO) payload/header) that the ultimate destination of the multipath data flow is the destination host 170. In this way, the ultimate destination of the packets in the second subflow 235 (e.g., destination host 170) does not need to be specified, as it is part of the same multipath data flow as the initial subflow 230, and the multipath proxy device 150 has already determined the ultimate destination of the multipath data flow. Alternatively, the header of the packets in the subflows 230 and 235 may specify that the source of the packet is the source host 110 and the destination is the multipath proxy 150. The payload encapsulated by the header may specify that the packet is to be directed to the destination host 170. When the multipath proxy 150 combines the subflows 230 and 235 into the single flow 240, the packets of the flow 240 may be marked with a source of the multipath proxy 150 and a destination of the destination host 170.

In another example, the network service 160 may include a firewall service that inspects the combined flow 240 to determine if the flow 240 is allowed to proceed to the destination host 170. If the flow 240 is not permitted, then the flow 240 is dropped. In some examples, the firewall service 160 may be configured to drop any individual subflows that originate from the source host 110 (e.g., subflow 230 or 235) to prevent the source host 110 from bypassing the firewall 160 with a portion of the multipath data flow. In another example, the firewall service 160 may be configured to drop the flow 240 if the source host 110 is not authorized to use one or both of the access networks 120 and/or 130.

Figure 3:
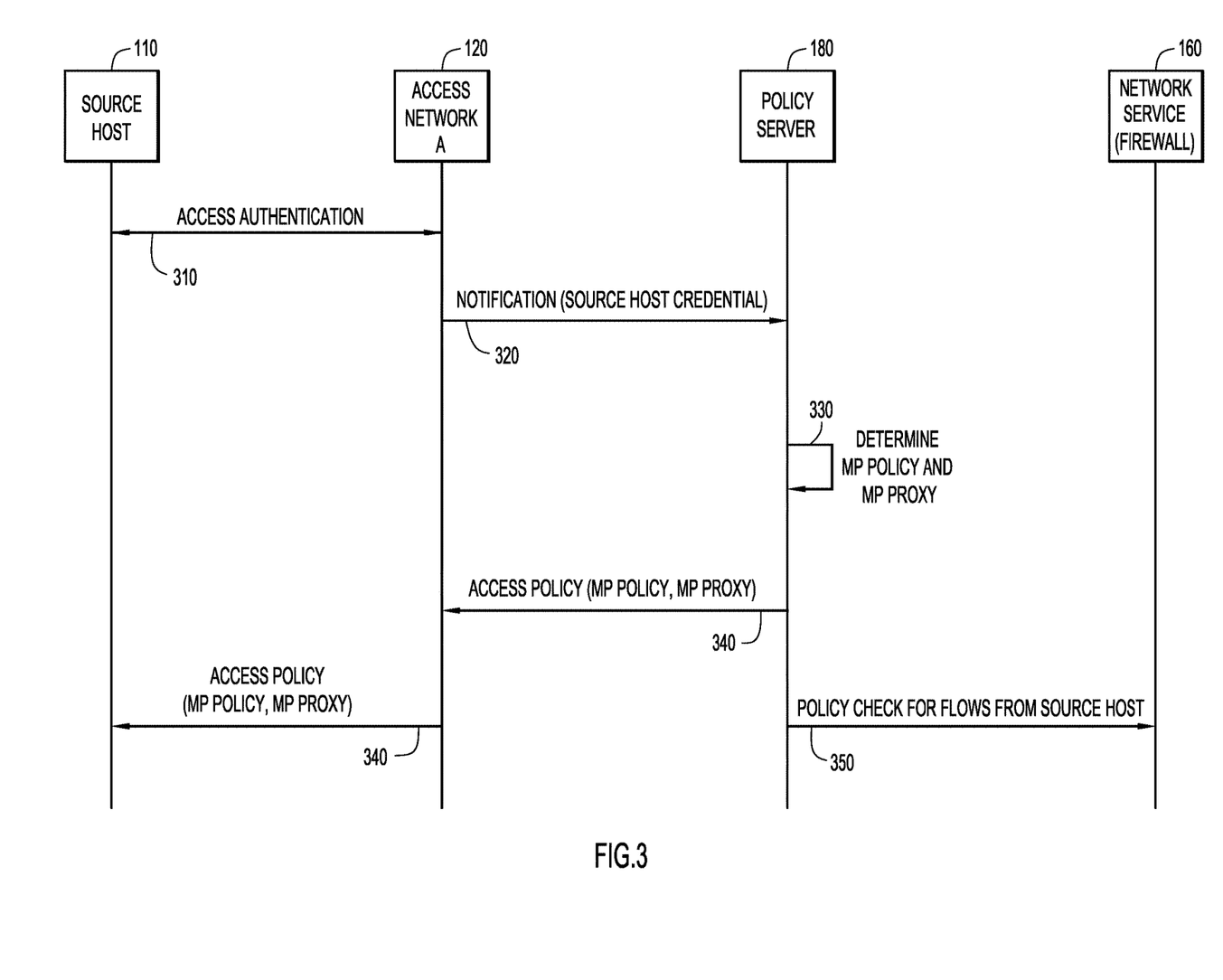
FIG. 3 is a message flow diagram of messages that provide a source host with a multipath access policy, according to an example embodiment.

Referring now to FIG. 3, a message flow diagram illustrates the messages passed between elements of the multipath system 100 to determine a multipath access policy for a source host. Initially, the source host 110 and the access network 120 (e.g., via a wireless access point 125) exchange messages 310 to establish an authenticated connection between the source host 110 and the access network 120. After the source host 110 has authenticated access into the access network 120, the access network 120 sends a notification 320 to the policy server 180. The notification 320 includes authentication credentials for a user of the source host 110 and may also include additional information about the source host 110 and/or the access network 120.

At 330, the policy server 180 determines an access policy based on the authentication credentials supplied by the source host 110. The access policy includes a multipath policy that determines under what circumstances (e.g., which applications) the source host 110 is permitted to use a multipath connection. The access policy also includes a set of network addresses corresponding to one or more multipath proxy devices. The access policy ensures that any multipath data flow from the source host 110 is directed to one of the multipath proxy devices to ensure that the entire flow is received at the network service 160 (e.g., a firewall). The policy server 180 returns the access policy 340 to the access network 120, which forwards the access policy 340 to the source host 110. Additionally, the policy server 180 may send a policy check 350 to the network service 160 to ensure that the network service 160 is properly configured to operate on multipath flows originating from the source host 110. For instance, policy check 350 may configure the network service 160 to drop any subflows of a multipath data flow from the source host 110 that does not arrive via one of the multipath proxy devices in the access policy.

Figure 4:
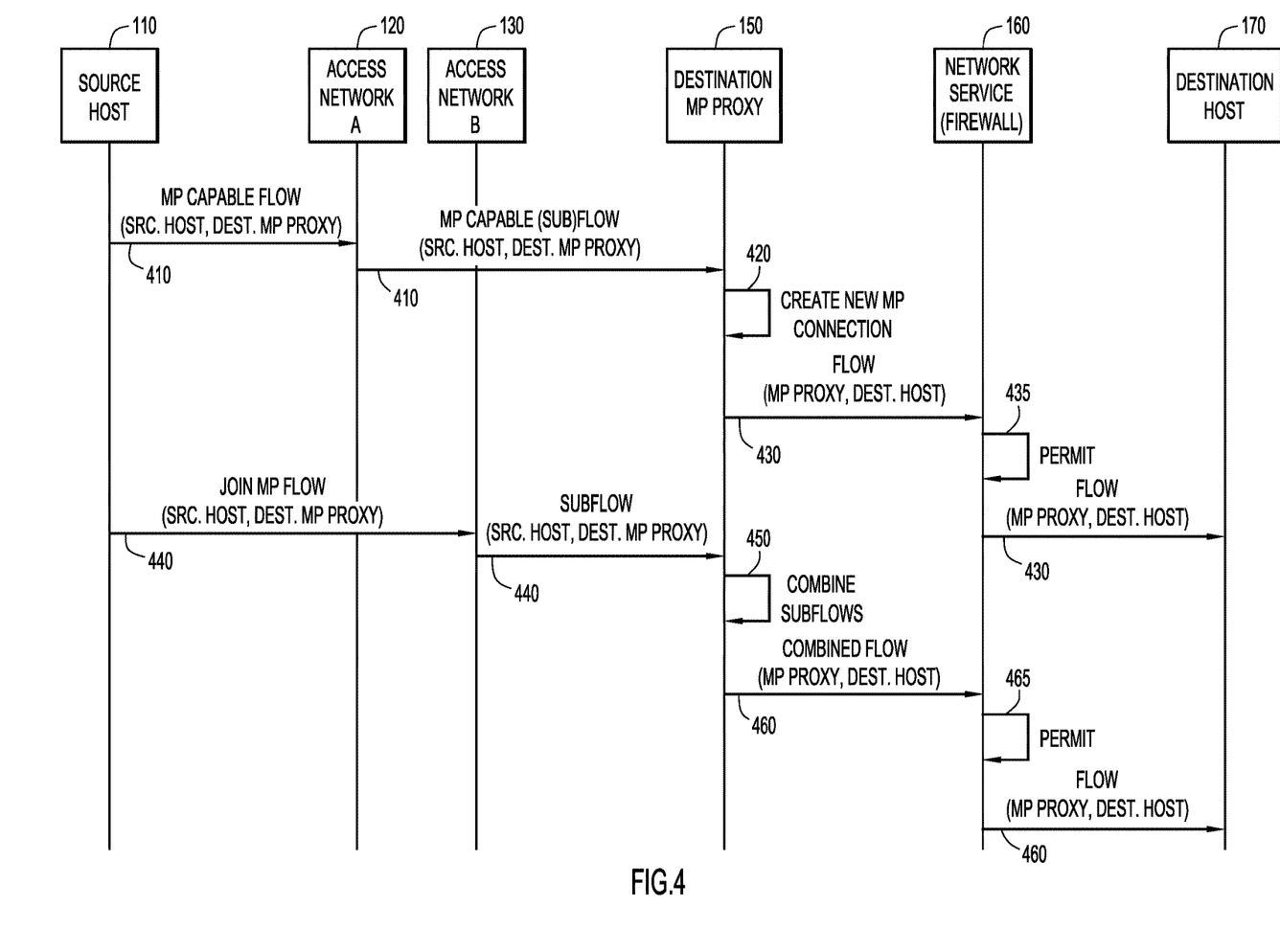
FIG. 4 is a message flow diagram of messages that establish a multipath data flow through a selected multipath proxy and network service, according to an example embodiment.

Referring now to FIG. 4, a message flow diagram illustrates the messages passed between elements of the multipath system 100 to send a multipath data flow from a source host 110 to a destination host 170 according to a multipath access policy specific to the source host 110 (e.g., as described with respect to FIG. 3). The source host 110 initiates the multipath data flow by sending a multipath capable subflow 410 to the multipath proxy 150 via the access network 120. In one example, the subflow 410 is the primary subflow of an MPTCP flow. Each of the packets in the subflow 410 are encapsulated by a header that indicates a source address/port corresponding to the source host 110 and a destination address/port corresponding to the multipath proxy 150. At 420, the multipath proxy 150 creates a new multipath connection and forwards the subflow 410 as a single path flow 430. In generating the single path flow 430, the multipath proxy 150 includes a source address/port corresponding to the multipath proxy 150 and a destination address/port corresponding to the destination host 170. The flow 430 reaches the network service 160 (e.g., a firewall service that permits the flow 430 at 435). After operating on the flow 430, the network service 160 sends the flow 430 to the destination host 170.

In generating a multipath data flow, the source host 110 sends a second subflow 440 to the multipath proxy 150 via the access network 130. In one example, the subflow 440 is a secondary subflow of an MPTCP flow. Each of the packets in the subflow 430 are encapsulated by a header that indicates a source address/port corresponding to the source host 110 and a destination address/port corresponding to the multipath proxy 150. At 450, the multipath proxy 150 combines the subflow 410 with the subflow 440 to generate a combined, single path flow 460. In generating the single path flow 460, the multipath proxy 150 includes a source address/port corresponding to the multipath proxy 150 and a destination address/port corresponding to the destination host 170. The flow 460 reaches the network service 160 (e.g., a firewall service that permits the flow 460 at 465). After operating on the flow 460, the network service 160 sends the flow 460 to the destination host 170.

Figure 5:
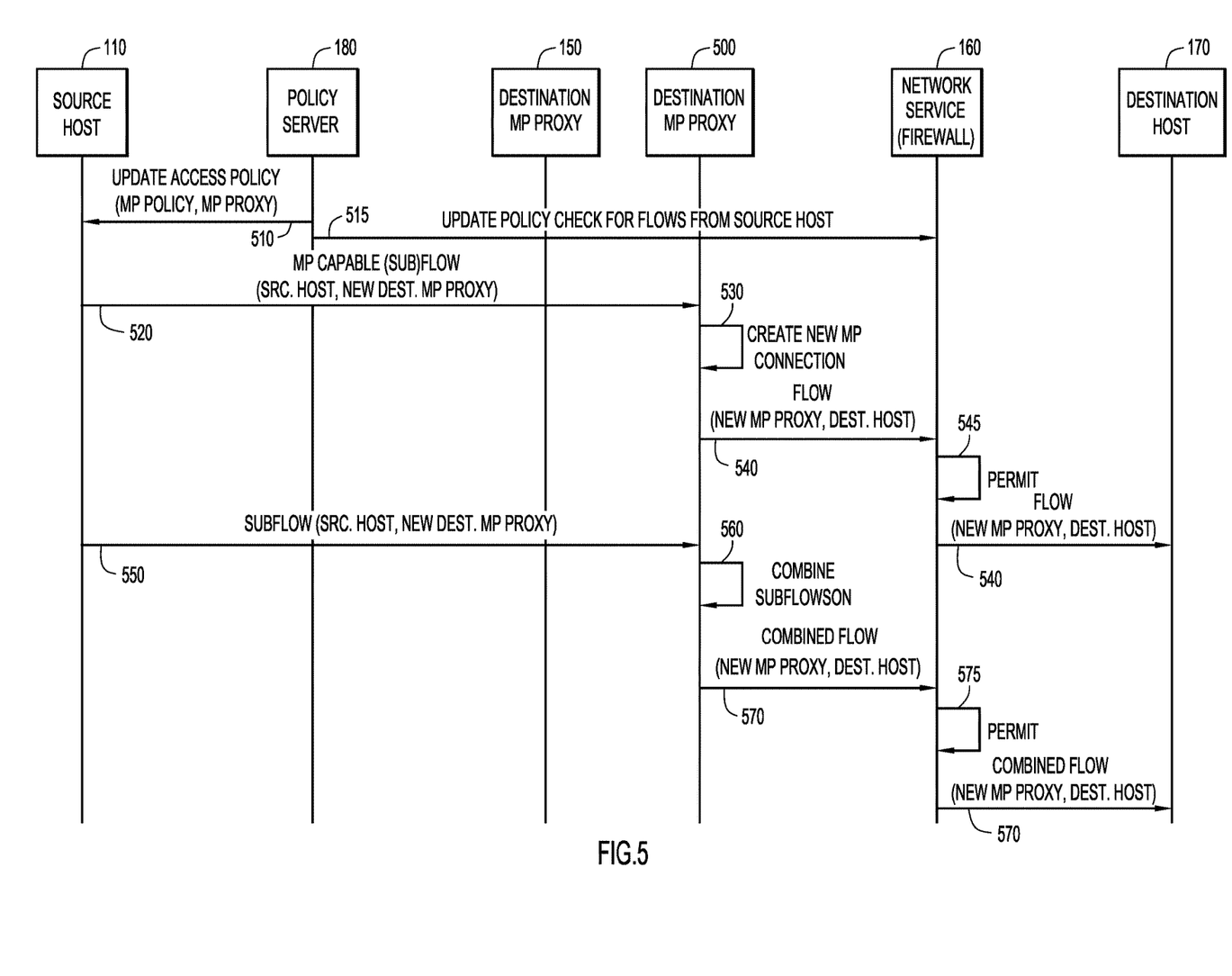
FIG. 5 is a message flow diagram of messages that update the multipath access policy to direct the multipath data flow to a new multipath proxy, according to an example embodiment.

Referring now to FIG. 5, a message flow diagram illustrates the messages passed between elements of the multipath system 100 to update the multipath access policy for a specific source host 110. In some instances, a policy server 180 may update the access policy for a source host 110. For example, if the load and/or availability of the multipath proxy devices changes significantly, the policy server 180 may determine that the source host 110 will be better served by directing multipath data flows to a new multipath proxy 500. Additionally, a change in location of the source host 110 may degrade the ability of the source host 110 to connect to the multipath proxy 150, or allow a newly-available connection to the multipath proxy 500. When the policy server 180 updates the access policy for the source host 110, the policy server 180 sends the updated access policy 510 to the source host 110. The policy server 180 may also send an updated policy check 515 for flows from the source host 110 to the network service 160 to ensure that the network service is configured according to the updated access policy.

After receiving the updated access policy 510 directing the source host 110 to use the new multipath proxy 500, the source host 110 sends a multipath capable subflow 520 to the multipath proxy 500. In one example, the subflow 520 is the primary subflow of an MPTCP flow. Each of the packets in the subflow 520 are encapsulated by a header that indicates a source address/port corresponding to the source host 110 and a destination address/port corresponding to the multipath proxy 500. In one example, the subflow 520 may include a TFO payload that indicates the ultimate destination of the multipath data flow as destination host 170. At 530, the multipath proxy 500 creates a new multipath connection and forwards the subflow 520 as a single path flow 540. In generating the single path flow 540, the multipath proxy 500 includes a source address/port corresponding to the multipath proxy 500 and a destination address/port corresponding to the destination host 170. The flow 540 reaches the network service 160 (e.g., a firewall service that permits the flow 540 at 545). After operating on the flow 540, the network service 160 sends the flow 540 to the destination host 170.

Similar to the message flow described with respect to FIG. 4, the source host 110 sends a second subflow 550 to the multipath proxy 500. In one example, the subflow 550 is a secondary subflow of an MPTCP flow. Each of the packets in the subflow 550 are encapsulated by a header that indicates a source address/port corresponding to the source host 110 and a destination address/port corresponding to the multipath proxy 500. At 560, the multipath proxy 500 combines the subflow 520 with the subflow 550 to generate a combined, single path flow 570. In generating the single path flow 570, the multipath proxy 500 includes a source address/port corresponding to the multipath proxy 500 and a destination address/port corresponding to the destination host 170. The flow 570 reaches the network service 160 (e.g., a firewall service that permits the flow 570 at 575). After operating on the flow 570, the network service 160 sends the flow 570 to the destination host 170.

In the example shown in FIG. 5, the updated access policy 510 directs the source host to a new multipath proxy 500. Alternatively, the updated access policy 510 may affect other aspects of the former access policy (e.g., the application-specific multipath policy), which may or may not immediately affect the flows from the source host 110. For instance, the updated access policy 510 may affect multipath flows that are not currently active.

Figure 6:
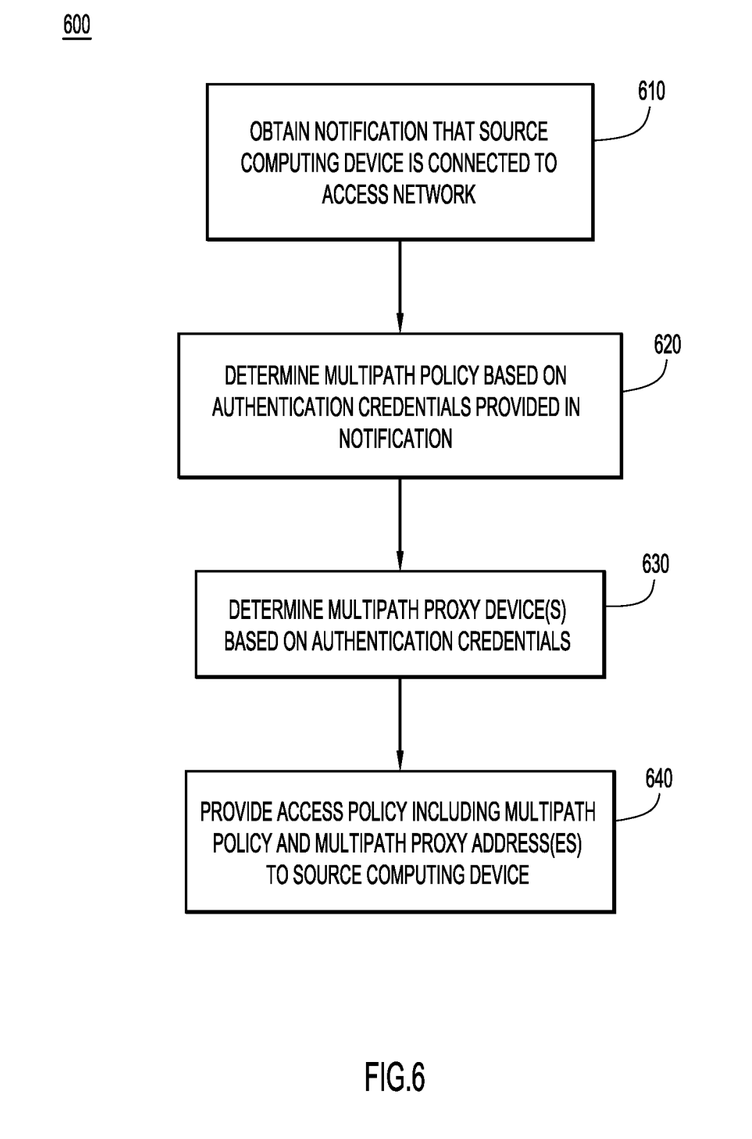
FIG. 6 is a flowchart depicting operations of a policy server in dynamically provisioning a multipath access policy to a source host device, according to an example embodiment.

Referring now to FIG. 6, a flowchart is shown for a process 600 by which a policy server (e.g., policy server 180) provides a multipath access policy to a source computing device. At 610, the policy server obtains a notification that a source computing device is connected to an access network. In one example, the notification includes authentication credentials associated with a user of the source computing device. At 620, the policy server determines a multipath policy based on the authentication credentials. The multipath policy determines whether data flows from the source computing device are transmitted over multiple network connections. In one example, the multipath policy may be further determined by characteristics of the source computing device (e.g., location, network interface capability, etc.) and/or destinations of data flows (e.g., destination application).

At 630, the policy server determines a set of one or more multipath proxy devices based on the authentication credentials. In one example, the set of multipath proxy devices may be determined by an authenticated identity associated with the source computing device, the location of the source computing device, characteristics of the access networks available to the source computing device, and/or characteristics (e.g., load, utilization, capacity, etc.) of the multipath proxy devices. At 640, the policy server provides an access policy to the source computing device. The access policy comprises the multipath policy, and one or more network addresses associated with the set of one or more multipath proxy devices.

Figure 7:
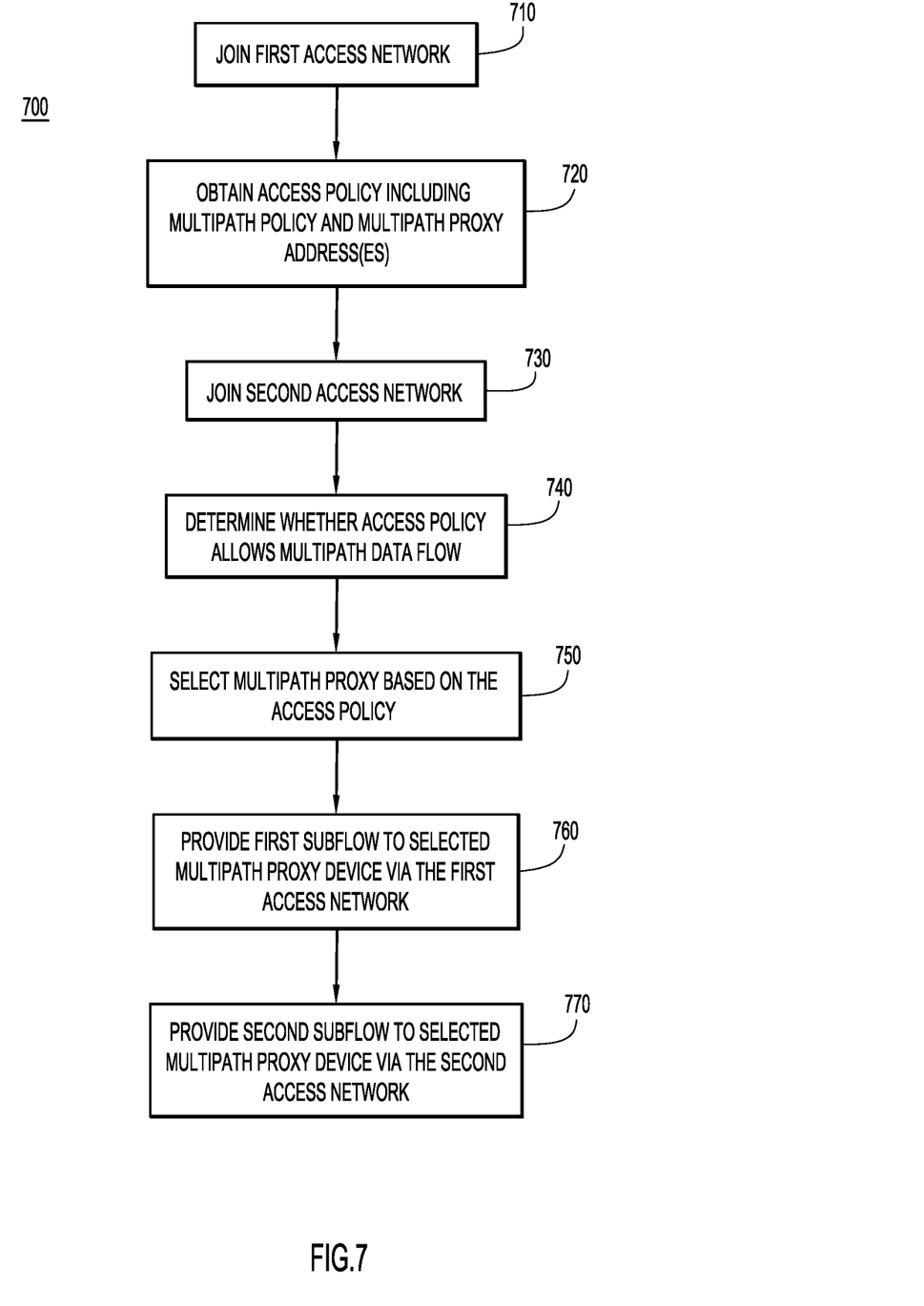
FIG. 7 is a flowchart depicting operations of a source host device in initiating a multipath data flow based on the multipath access policy provided by a policy server, according to an example embodiment.

Referring now to FIG. 7, a flowchart is shown for a process 700 by which a source computing device (e.g., source host 110) initiates a multipath data flow according to a dynamically determined access policy. At 710, the source computing device joins a first access network. In one example, the first access network may be a wireless network (e.g., IEEE 802.11, LTE, CBRS, etc.). At 720, the source computing device obtains an access policy including a multipath policy and one or more network addresses associated with one or more corresponding multipath proxy devices. In one example, the access policy is dynamically determined by a policy server based on authentication credentials, characteristics of the source computing device, destinations of data flows, characteristics of the access network available to the source computing device, and/or characteristics of the multipath proxy devices.

At 730, the source computing device joins a second access network. In one example, the second access network may be a wireless network based on a different protocol than the protocol of the first access network. For instance, the first access network may be an IEEE 802.11-based network, and the second network may be an LTE-based network. Alternatively, the first access network and/or the second access network may be a wired network (e.g., Ethernet-based). At 740, the source computing device determines whether the access policy allows a data flow to span the first access network and the second access network. At 750, the source computing device selects a multipath proxy device based on the access policy.

At 760, the source computing device provides a first subflow of a multipath data flow to the selected multipath proxy device via the first access network. In one example, the first subflow is an MPTCP subflow that indicates the first subflow is multipath capable. At 770, the source computing device provides a second subflow of the multipath data flow to the selected multipath proxy device via the second access network. In one example, the second subflow is an MPTCP subflow that joins the first subflow.

Figure 8:
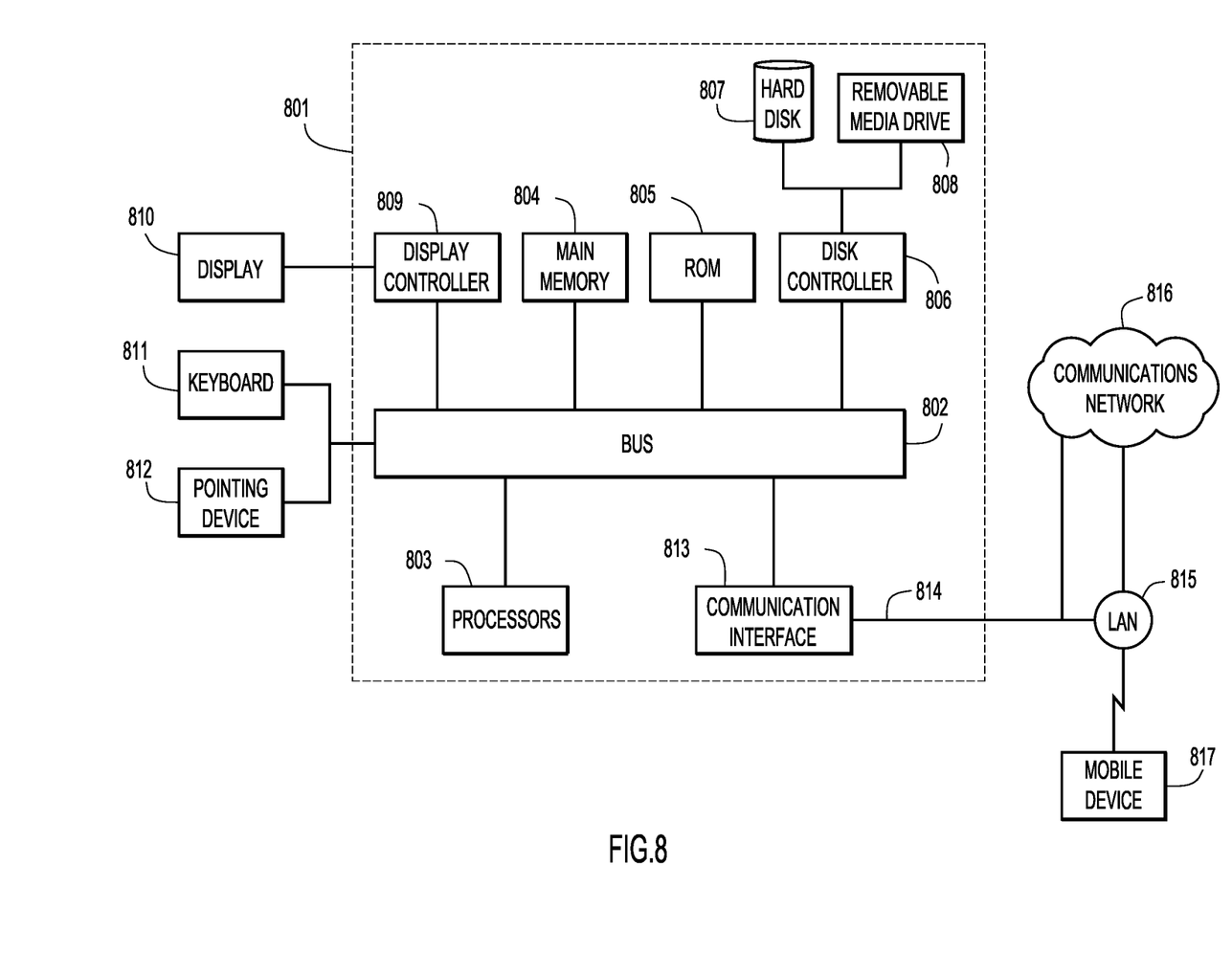
FIG. 8 is a simplified block diagram of a computing device that may be configured to perform methods presented herein, according to an example embodiment.

Referring now to FIG. 8, an example of a block diagram of a computer system 801 that may be representative of the policy server 180 or the source host 110 in which the embodiments presented may be implemented is shown. The computer system 801 may be programmed to implement a computer based device, such as an AAA server for a computer network. The computer system 801 includes a bus 802 or other communication mechanism for communicating information, and a processor 803 coupled with the bus 802 for processing the information. While the figure shows a single block 803 for a processor, it should be understood that the processors 803 may represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive, solid state drive, etc.). The storage devices may be added to the computer system 1001 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 801 may also include a display controller 809 coupled to the bus 802 to control a display 810, such as a liquid crystal display (LCD) or light emitting diode (LED) display, for displaying information to a computer user. The computer system 801 includes input devices, such as a keyboard 811 and a pointing device 812, for interacting with a computer user and providing information to the processor 803. The pointing device 812, for example, may be a mouse, a trackball, track pad, touch screen, or a pointing stick for communicating direction information and command selections to the processor 803 and for controlling cursor movement on the display 810. In addition, a printer may provide printed listings of data stored and/or generated by the computer system 801.

The computer system 801 performs a portion or all of the processing steps of the operations presented herein in response to the processor 803 executing one or more sequences of one or more instructions contained in a memory, such as the main memory 804. Such instructions may be read into the main memory 804 from another computer readable storage medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the operations presented herein, and for enabling the computer system 801 to interact with a human user (e.g., a network administrator or user). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local area network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 may be implemented in baseband signals, or carrier wave based signals. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA), tablet computer, laptop computer, or cellular telephone.

In summary, the techniques presented herein allow an enterprise to have finer control over multipath usage within the enterprise network by delivering policy elements as part of the access authentication process. Tying the multipath proxy selection to the access authentication pushes the multipath policy to source hosts as an explicit policy decision. The network selectively enables multipath capabilities based on a user, application, destination, and/or access network basis. The network also selects a multipath proxy/anchor based on location, access network or network load conditions. The network further dynamically triggers network services, such as firewall functions, to enable/disable multipath support on a user/application/flow basis.

The dynamic selection of a multipath proxy device, as presented herein, also addresses the issue of scaling multipath proxy devices with increasing network size. In particular, allocating multipath proxies on-demand assists in streamlining the data plane features in multipath deployments of enterprise networks, allowing horizontal scaling and optimal use of computing resources.

In one form, a method is provided for a policy server to determine and explicitly provide a source computing device with a multipath access policy. The method includes obtaining a notification that a source computing device is connected to an access network. The notification includes authentication credentials associated with a user of the source computing device. The method also includes determining a multipath policy based on the authentication credentials. The multipath policy determines whether data flows from the source computing device are transmitted over multiple network connections. The method further includes determining a set of one or more multipath proxy devices based on the authentication credentials. The method includes providing an access policy to the source computing device. The access policy comprises the multipath policy and one or more network addresses associated with the set of one or more multipath proxy devices.

In another form, an apparatus is provided comprising a network interface and a processor. The network interface is configured to communicate with a plurality of computing devices over one or more computer networks. The processor is coupled to the network interface and configured to obtain via the network interface, a notification that a source computing device is connected to an access network. The notification includes authentication credentials associated with a user of the source computing device. The processor is also configured to determine a multipath policy based on the authentication credentials. The multipath policy determines whether data flows from the source computing device are transmitted over multiple network connections. The processor is further configured to determine a set of one or more multipath proxy devices based on the authentication credentials. The processor is also configured to cause the network interface to provide an access policy to the source computing device. The access policy comprises the multipath policy and one or more network addresses associated with the set of one or more multipath proxy devices.

In yet another form, one or more non-transitory computer readable storage media is encoded with software comprising computer executable instructions and, when the software is executed by a processor on a policy server, operable to cause the processor to obtain a notification that a source computing device is connected to an access network. The notification includes authentication credentials associated with a user of the source computing device. The software is also operable to cause the processor to determine a multipath policy based on the authentication credentials. The multipath policy determines whether data flows from the source computing device are transmitted over multiple network connections. The software is further configured to cause the processor to determine a set of one or more multipath proxy devices based on the authentication credentials. The software is also configured to cause the processor to provide an access policy to the source computing device. The access policy comprises the multipath policy and one or more network addresses associated with the set of one or more multipath proxy devices.

The above description is intended by way of example only. Although the present disclosure has been described in detail with reference to particular arrangements and configurations, these example configurations and arrangements may be changed significantly without departing from the scope of the present disclosure.

What is claimed is:

1. A method comprising:
   at a policy server, obtaining a notification that a source computing device is connected to an access network, the notification including authentication credentials associated with a user of the source computing device;
   determining a multipath policy based on the authentication credentials, wherein the multipath policy determines whether data flows from the source computing device are transmitted over multiple network connections;
   determining a set of one or more multipath proxy devices based on the authentication credentials;
   providing an access policy to the source computing device, the access policy comprising the multipath policy and one or more network addresses associated with the set of one or more multipath proxy devices; and
   providing a configuration message to a network service, the configuration message identifying the source computing device and enabling the network service to identify a single path data flow from the source computing device that is generated at the set of one or more multipath proxy devices by combining a plurality of subflows in a multipath data flow.

2. The method of claim 1, wherein the multipath policy or the set of one or more multipath proxy devices are further determined based on location information associated with the source computing device.

3. The method of claim 1, wherein the multipath policy or the set of one or more multipath proxy devices are further determined based on network information associated with the access network.

4. The method of claim 1, further comprising:
   updating the access policy for the source computing device by determining an updated set of multipath proxy devices; and
   providing the updated access policy to the source computing device.

5. The method of claim 1, wherein the set of one or more multipath proxy devices are determined according to load information associated with the one or more multipath proxy devices.

6. The method of claim 1, wherein the network service comprises a firewall service, and wherein the configuration message selectively disables multipath support for data flows from the source computing device.

7. The method of claim 1, further comprising providing a configuration message to a network service that causes the network service to drop data flows from the source computing device that bypass the one or more multipath proxy devices.

8. The method of claim 1, wherein the set of one or more multipath proxy devices includes a plurality of multipath proxy devices, each multipath proxy device in the plurality of multipath proxy devices being associated with a different type of data flow.

9. The method of claim 1, further comprising provisioning at least one additional multipath proxy device based on the multipath policy.

10. An apparatus comprising:
    a network interface configured to communicate with a plurality of computing devices over one or more computer networks; and a processor coupled to the network interface and configured to:
  obtain via the network interface, a notification that a source computing device is connected to an access network, the notification including authentication credentials associated with a user of the source computing device;
  determine a multipath policy based on the authentication credentials, wherein the multipath policy determines whether data flows from the source computing device are transmitted over multiple network connections;
  determine a set of one or more multipath proxy devices based on the authentication credentials;
  cause the network interface to provide an access policy to the source computing device, the access policy comprising the multipath policy and one or more network addresses associated with the set of one or more multipath proxy devices; and
  cause the network interface to provide a configuration message to a network service, the configuration message identifying the source computing device and enabling the network service to identify a single path data flow from the source computing device that is generated at the set of one or more multipath proxy devices by combining a plurality of subflows in a multipath data flow.

11. The apparatus of claim 10, wherein the processor is further configured to determine the multipath policy or the set of one or more multipath proxy devices based on location information associated with the source computing device.

12. The apparatus of claim 10, wherein the processor is further configured to determine the multipath policy or the set of one or more multipath proxy devices based on network information associated with the access network.

13. The apparatus of claim 10, wherein the processor is further configured to:
  update the access policy for the source computing device by determining an updated set of multipath proxy devices; and
  cause the network interface to provide the updated access policy to the source computing device.

14. The apparatus of claim 10, wherein the processor is further configured to determine the set of one or more multipath proxy devices according to load information associated with the one or more multipath proxy devices.

15. The apparatus of claim 10, wherein the network service comprises a firewall service, and wherein the configuration message selectively disables multipath support for data flows from the source computing device.

16. One or more non-transitory computer readable storage media encoded with software comprising computer executable instructions and, when the software is executed by a processor on a policy server, operable to cause the processor to:
  obtain a notification that a source computing device is connected to an access network, the notification including authentication credentials associated with a user of the source computing device;
  determine a multipath policy based on the authentication credentials, wherein the multipath policy determines whether data flows from the source computing device are transmitted over multiple network connections;
  determine a set of one or more multipath proxy devices based on the authentication credentials;
  provide an access policy to the source computing device, the access policy comprising the multipath policy and one or more network addresses associated with the set of one or more multipath proxy devices; and
  provide a configuration message to a network service, the configuration message identifying the source computing device and enabling the network service to identify a single path data flow from the source computing device that is generated at the set of one or more multipath proxy devices by combining a plurality of subflows in a multipath data flow.

17. The non-transitory computer readable storage media of claim 16, further comprising instructions operable to cause the processor to determine the multipath policy or the set of one or more multipath proxy devices based on location information associated with the source computing device.

18. The non-transitory computer readable storage media of claim 16, further comprising instructions operable to cause the processor to determine the multipath policy or the set of one or more multipath proxy devices based on network information associated with the access network.

19. The non-transitory computer readable storage media of claim 16, further comprising instructions operable to cause the processor to:
  update the access policy for the source computing device by determining an updated set of multipath proxy devices; and
  provide the updated access policy to the source computing device.

20. The non-transitory computer readable storage media of claim 16, further comprising instructions operable to cause the processor to determine the set of one or more multipath proxy devices according to load information associated with the one or more multipath proxy devices.

21. The non-transitory computer readable storage media of claim 16, wherein the configuration message selectively disables multipath support for data flows from the source computing device.

22. The apparatus of claim 10, wherein the processor is further configured to provision at least one additional multipath proxy device based on the multipath policy.

23. The non-transitory computer readable storage media of claim 16, further comprising instructions operable to cause the processor to provision at least one additional multipath proxy device based on the multipath policy.

* * * * *